United States Patent [19]

Renshaw

[11] Patent Number: 4,527,727
[45] Date of Patent: Jul. 9, 1985

[54] STABILIZED ULTRASONIC WELDING APPARATUS

[75] Inventor: Theodore A. Renshaw, North Babylon, N.Y.

[73] Assignee: Fairchild Industries, Inc., Chantilly, Va.

[21] Appl. No.: 484,180

[22] Filed: Apr. 12, 1983

[51] Int. Cl.³ ............................................. B23K 20/10
[52] U.S. Cl. .................................. 228/1.1; 156/580.1
[58] Field of Search .............. 228/1 R, 1 B; 156/73.1, 156/73.4, 580.1

[56] References Cited

U.S. PATENT DOCUMENTS

| 3,396,892 | 8/1968 | Balamuth | 228/1 R |
| 3,654,041 | 4/1972 | Wysong | 228/1 R X |
| 3,863,826 | 2/1975 | Shoh | 228/1 R |

Primary Examiner—Kenneth J. Ramsey
Attorney, Agent, or Firm—Michael W. York

[57] ABSTRACT

Ultrasonic spot welding apparatus is provided including a welding tip and a complimentary anvil, both mounted on a stationary welding frame and between which workpieces may be inserted for welding. The welding tip includes a vibratory reed adapted to introduce into and through the workpieces high frequency vibratory energy in order to effect a weld between the workpieces. The apparatus includes a reed stabilizer for clamping about and stabilizing the vibratory reed at its nodal point and clamping means for clamping the workpieces. The clamping means are mounted on a clamping frame which is pivotably mounted to the stationary welding frame.

8 Claims, 5 Drawing Figures

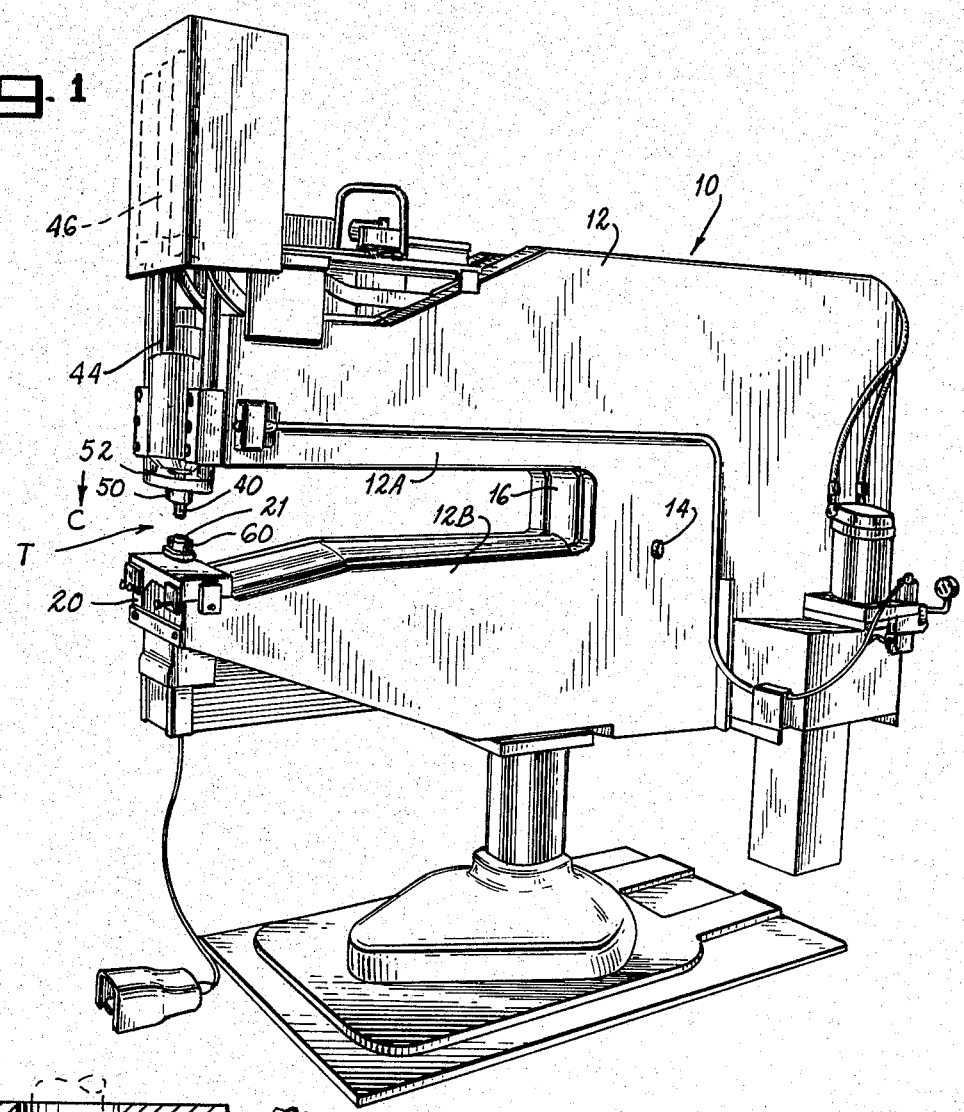
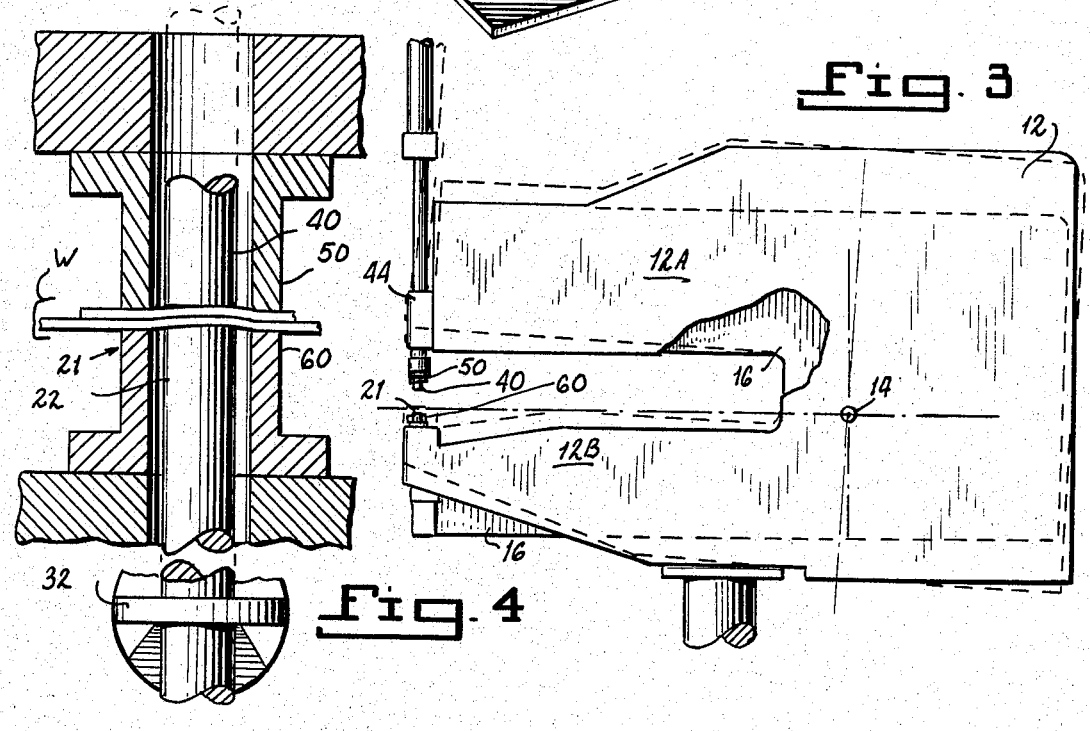

STABILIZED ULTRASONIC WELDING APPARATUS

BACKGROUND OF THE INVENTION

The present invention relates generally to stabilized ultrasonic wedge-reed welding apparatus and, more particularly, to such apparatus wherein the vibratory reed is supported or otherwise stabilized at its nodal point by stabilizing means so as to prevent the reed from deflecting significant distances during welding. The apparatus, further includes a clamping system adapted to clamp the workpieces prior to and during welding to prevent movement or twisting of the workpieces during the welding operation.

Ultrasonic vibratory spot welding processes for joining together two or more similar or dissimilar materials have been used for a number of years. Until recently, however, such methods were limited to use on thermoplastics, non-woven fabrics and metals where weld strength and integrity were not particularly important. This limitation was due, in large measure, to the problems associated with the ultrasonic welding methods employed, most of which were in prototype stages. In those instances when weld strength and weld integrity were important, i.e., when joining together structural aircraft panels and the like, resistance spot welding procedures were used.

Ultrasonic spot welding procedures have recently demonstrated strong potential for improved sheet metal assembly at reduced cost when compared with resistance spot welding and adhesive bonding techniques. Early studies have indicated that welds effected using prototype ultrasonic welding equipment such as, for example, a Sonobond M-8000 ultrasonic spot welder, were superior to welds produced using conventional resistance spot welding procedures. These early trials indicated that for virtually any material combination, an ultrasonically produced spot weld has an ultimate yield strength of more than 2.5 times that of a weld produced usidng resistance spot welding equipment. Further tests indicated that ultrasonically produced spot welding can be accomplished with a 75% time and cost savings over conventional adhesive bonding techniques. Until now, however, ultrasonic spot welding for large structural metal parts was not possible in a production environment because of the numerous problem associated with the procedures.

Ultrasonic vibratory welding is a metallurgical joining technique which utilizes high frequency vibrations to disrupt the surface films and oxides and which, therefore, promotes interatomic diffusion and plastic flow between the surfaces in contact without any melting of the materials. Briefly stated, the ultrasonic welding process consists of clamping or otherwise securing together the workpieces under moderate pressure between the welding tip and a support anvil and then introducing high frequency vibratory energy into the pieces for a relatively short period of time, i.e., from a fraction of a second to a number of seconds. In many instances, the pieces to be welded are also adhesively bonded together by the insertion of an adhesive bonding agent between the juxtaposed pieces before welding which results in a high strength joint with superior static and fatigue properties.

One example of an ultrasonic spot welder particularly adapted for use on structural metal workpieces is the Sonobond Model M-8000 ultrasonic spot welder marketed by Sonobond Corporation of West Chester, PA. This welder includes a transistorized, solid state frequency converter which raises standard 60 Hz electrical line frequency to 15-40 kHz and then amplifies the output. The high frequency electrical power travels through a lightweight cable to a transducer in the welding head where it is converted to vibratory power at the same frequency. The vibratory power is, thereupon, transmitted through an acoustic coupling system to the welding tip and then through the tip into and through the workpieces, with the vibratory energy effecting the weld.

The Sonobond M-8000 ultrasonic spot welder includes a wedge-reed, transducer coupling system which transmits lateral vibrations of a perpendicular reed member attached to it so that the welding tip at the upper end of the reed executes shear vibrations on the surface of the workpieces. The transducer includes piezoelectric ceramic elements encased in a tension shell assembly and operates at a nominal frequency of 15 kHz. A solid state frequency converter with a transistorized hybrid junction amplifier powers the welder. The converter operates at a nominal frequency of 15 kHz with a power output variable up to about 4000 RMS RF watts. The welder may be tuned to a precise operating frequency. The frequency converter includes a wide-band RF power measuring circuit which samples output power and detects forward power and load power based on the principle of bi-directional coupling in a transmission line. The signal is processed electronically to provide true RMS values which are selectively displayed on an LED panel meter as either the forward or load power. Forward power is the output of the frequency converter delivered to the transducer in the welding head while load power is the transducer drive power acoustically absorbed in the work zone. The difference between the two readings is the reflected power induced by the load impedance mismatch and is minimized during the welding operation by impedance matching techniques.

In early trials using prototype ultrasonic welding equipment to weld aluminum alloys, it was discovered that certain problems were encountered particularly with regard to movement between the workpieces to be welded together, with the motion of the workpieces away from the weld zone and with "tip walking", i.e., the welding tip tended to walk or otherwise move laterally or horizontally during the course of the welding cycle. As can be readily appreciated, these actions create highly undesirable conditions in that it is virtually impossible to precisely pinpoint the point of weld. It was discovered that these actions arise because of an instability situation that develops during the welding process. Heat is generated at the nubbed interfaces by friction and clamping. This heat is sufficient to expand the workpieces locally and to create a "thermal mound" on which the tip; anvil and workpieces are unstably perched. The transverse vibrations tend to kick the perched elements apart so that they slide down the "mound" and this is effected as workpieces twisting, workpiece ejection or "tip walking". "Tip walking" was only detected after clamps were applied so that the workpieces could not be twisted or forced away from the work zone. When the welding tip "walks" away from the thermal mound it leaves the highest temperature site which would, as a result, have enhanced the weld strength. Tip walking tends to disperse the effective welding energy and, as a result, reduces weld strength. It has been demonstrated that when tip walking does not occur and the welding tip remains stably located at the thermal mound created at the weld site, all of the evolving frictional energy of the welding tip is focused at one point and the resultant weld strength is higher.

In an effort to reduce workpiece movement and produce consistent, strong welds, it has been found necessary to utilize a clamping system at or near the spot to be welded to tightly hold together the workpieces so as to prevent them from moving or twisting due to the powerful forces generated during the welding procedure. Additionally, control must be established over the mechanical waves and forces that are emitted from the working area so that these forces are not strong enough to damage those areas of the workpieces remote from the work spot. Absence of positive control over these forces have resulted in a degree of uncertainty with respect to the normal integrity of prior welds, bonds, mechanical attachments or stress concentrations.

The use of ordinary screw type C-clamps and spring-loaded clamps as a clamping system to hold the workpieces together and in place during welding has generally proven unacceptable in that such clamps tend to move about and/or gouge the workpieces.

Early modifications of the ultrasonic welding equipment supplied by Sonobond Corporation included a "full throat clamping system" which included an upper clamp structure fixed to the reed base and a lower clamp structure attached to a movable element driven by hydraulic cylinders attached to the anvil base. Reaction of the clamping loads was carried through the machine frame. A threaded screw was provided in the upper clamp to permit adjustment of the clamp plane relative to the planes of the upper workpiece and welding tip. Such an adjustment feature, however, proved inadequate because the workpiece clamp column and reed-anvil column were both loaded in compression to different degrees during welding so that the initial adjustments of the planes were not able to meet the dynamic situation when the planes shifted vertically. Additionally, in order to effectuate a good ultrasonic weld, it was necessary for the welding tip and/or anvil to penetrate the workpiece which required shifting of the plane of the welding tip to the clamp which was incapable of being accomplished by this clamping arrangement. Elastic deformation of the workpiece is necessary to accommodate this shift or a compensating initial misplacement of the tip to allow its penetration during welding. The necessary elastic deformation of the workpieces before or after welding can be easily accommodated if the clamps around the tip are wide enough to accommodate minor bowing. When the clamps are moved in closer and misplacement of the planes existed, serious shear loads are passed between the welding tip and anvil and the clamps. These loads could seriously distort the workpieces and/or prevent welding by providing a preferred path for the ultrasonic energy passage from the welding tip. Such a clamping practice proves impracticable for close clamping which is required in complex assemblies.

Additionally when clamps are present, it has been found that support must be applied to the reed at a nodal point in order to restrain the reed and its welding tip from deflecting significant distances away from its normal location when the welding tip is brought into contact with the workpieces. The selection of the actual nodal point precludes the support from interferring with the delivery of ultrasonic power from the attached transducer to the wedge-reed assembly and then into the workpiece at the welding tip. Utilization of a reed stabilizing support prevents the welding tip from "walking" or displacing itself from its intial clamped-up location thus permitting the ultrasonic power to be constantly focused at a single location resulting in a more useful and efficient application of that power. Reed stabilization also contributes to a "cleaner" application of ultrasonic power in that there is a marked reduction in mechanical noise generated by stick-slip actions in the weld zone. Stick-slip actions are momentary gross motions that can occur, for example, when the tip walks and then snaps back. This noise is deleted by oscilloscope traces of the voltage in the piezoelectric transducer. Without reed stabilization support the oscilloscope is so noisy that the 15 Kc cyclical waves cannot be detected. With the reed support, the noise vanishes and the clean 15 Kc signal appears.

Against the foregoing background of the invention, it is a primary object of the present invention to provide ultrasonic welding apparatus which includes means for preventing deflection of the vibratory reed and its welding tip during the welding operation.

It is still another object of the present invention to provide such apparatus wherein support is provided at a nodal point on the vibratory reed of the apparatus.

It is yet another object of the present invention to provide such apparatus which includes a clamping system at or near the spot to be welded in order to prevent movement or twisting of the workpieces during the welding operation.

It is still yet another object of the present invention to provide such a clamping system which is pivotably mounted to a stationary welding frame.

SUMMARY OF THE INVENTION

The present invention, in brief summary, comprises ultrasonic spot welding apparatus including a vibratory reed having a welding tip and a complimentary anvil both mounted on a stationary frame which define a throat between which workpieces may be inserted for welding. The vibratory reed through its welding tip is adapted to introduce into and through the workpieces high frequency vibratory energy in an amount sufficient to effect a weld therebetween. The apparatus includes a reed stabilizing means for supporting and stabilizing the vibratory reed at its nodal point and clamping means mounted on a clamping frame pivotably mounted to or by said stationary frame for clamping the workpieces in place to prevent movement and/or twisting of the workpieces during the welding operation.

BRIEF DESCRIPTION OF THE DRAWINGS

FIG. 1 is a general side perspective view of the ultrasonic welding apparatus of the subject invention;

FIG. 3 is a side view of the apparatus illustrating the manner in which the clamping frame pivots relative to the stationary welding frame;

FIG. 4 is an enlarged sectional view of the welding zone; and

DETAILED DESCRIPTION OF THE INVENTION

Figure 2:
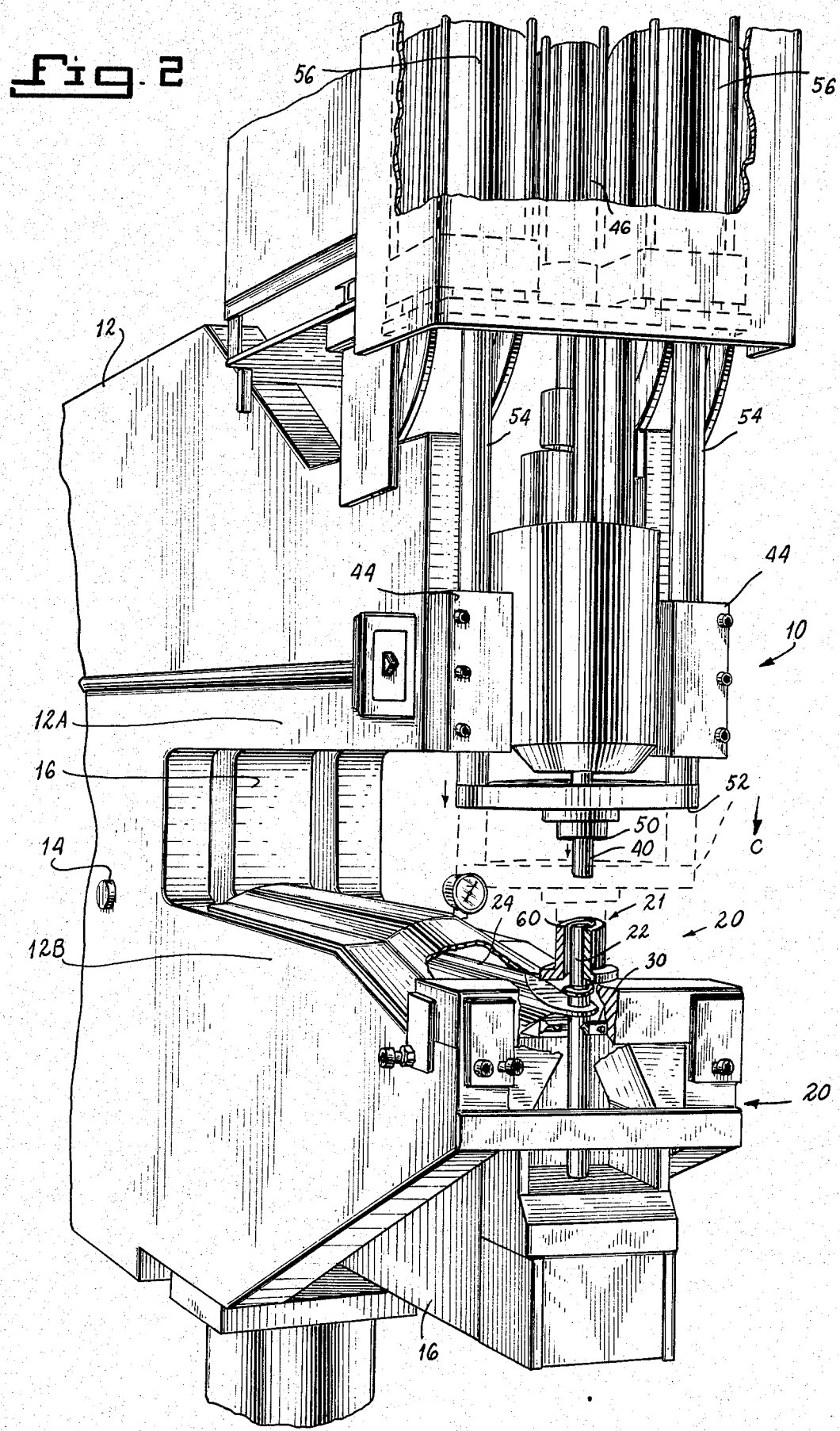
FIG. 2 is a general front perspective view of the apparatus of FIG. 1 illustrating the stabilizing and clamping means of the subject invention.

An ultrasonic spot welding machine capable of welding together structural metal sheets, referred to generally by reference numeral 10, is illustrated in side perspective view in FIG. 1. Ultrasonic spot welder 10 includes a generally C-shaped clamping frame 12 pivotably mounted about pivot 14 and supported on a stationary central welder frame 16. Clamping frame 12 includes elongated upper and lower sections 12A and 12B, respectively, which, in combination with the central welder frame 16, define a throat T into which the workpieces to be welded may be inserted for welding.

A welding head 20, including a welding tip 21, which forms and end of a vibratory reed 22, is provided and is secured to stationary welder frame 16. A slideably mounted anvil 40 is provided on the opposite side of the throat. Collar clamps 50 and 60 are provided about the anvil 40 and the welding tip 21, respectively.

Anvil 40, which is movable toward and away from welding tip 21 along anvil guide 44, is powered by at least one internally contained, hydraulic anvil cylinder 46. Movement of anvil 40 is independent of movement of collar clamp 50. When a workpiece W to be welded (not shown in FIG. 1) is inserted into the throad between the anvil 40 and the welding tip 21, the anvil 40 is lowered in a clamping direction C toward welding tip 21 until, as shown in FIG. 4, the workpieces are clamped together between collar clamps 50 and 60. This clamping action between the clamps 50 and 60 not only serves to clamp the workpieces together but, additionally, causes a compressive force to be applied between them. Spot welding of the workpieces may therefore be accomplished in the manner hereinafter described.

Vibratory reed 22, at its end opposite the welding tip 21, is connected to a transducer 24 as shown in FIG. 2 which is contained within welding frame 16. Transducer 24 transmits lateral vibrations and induces flexural vibration of the reed 22 so that the welding tip 21 at the upper end of the reed 22 may introduce sheer vibrations into workpieces. Transducer 24 consists of piezoelectric ceramic elements encased in a tension shell assembly and is operated at a nominal frequency of about 15 kH$_z$.

Spot welder 10, which is a modification of the Sonobond Model M-8000 ultrasonic spot welder, includes a frequency converter which incorporates a wide-band RF power measuring circuit for sampling the output power to detect the forward power and the load power based on the principle of directional coupling in a transmission line. The signal is processed electronically by internal circuitry to provide true RMF values which are displayed as either the forward power or the load power. Forward power is the output of the frequency converter delivered to the transducer in the welding tip 21 while load power is the transducer drive power that is acoustically absorbed in the weld zone. The difference between the forward power and the load power represents the reflected power induced by the load impedance mismatch and is minimized during subsequent welding operations by impedance matching techniques.

Welding tip 21 and anvil 40 are both fabricated from a generally hard metal such as, for example, steel hardened to about R$_c$ 50. The radii of the welding tip 21 may be between about 2" and about 20" and the shape and dimension of anvil 40 generally conforms to that of the welding tip 21.

Figure 5:
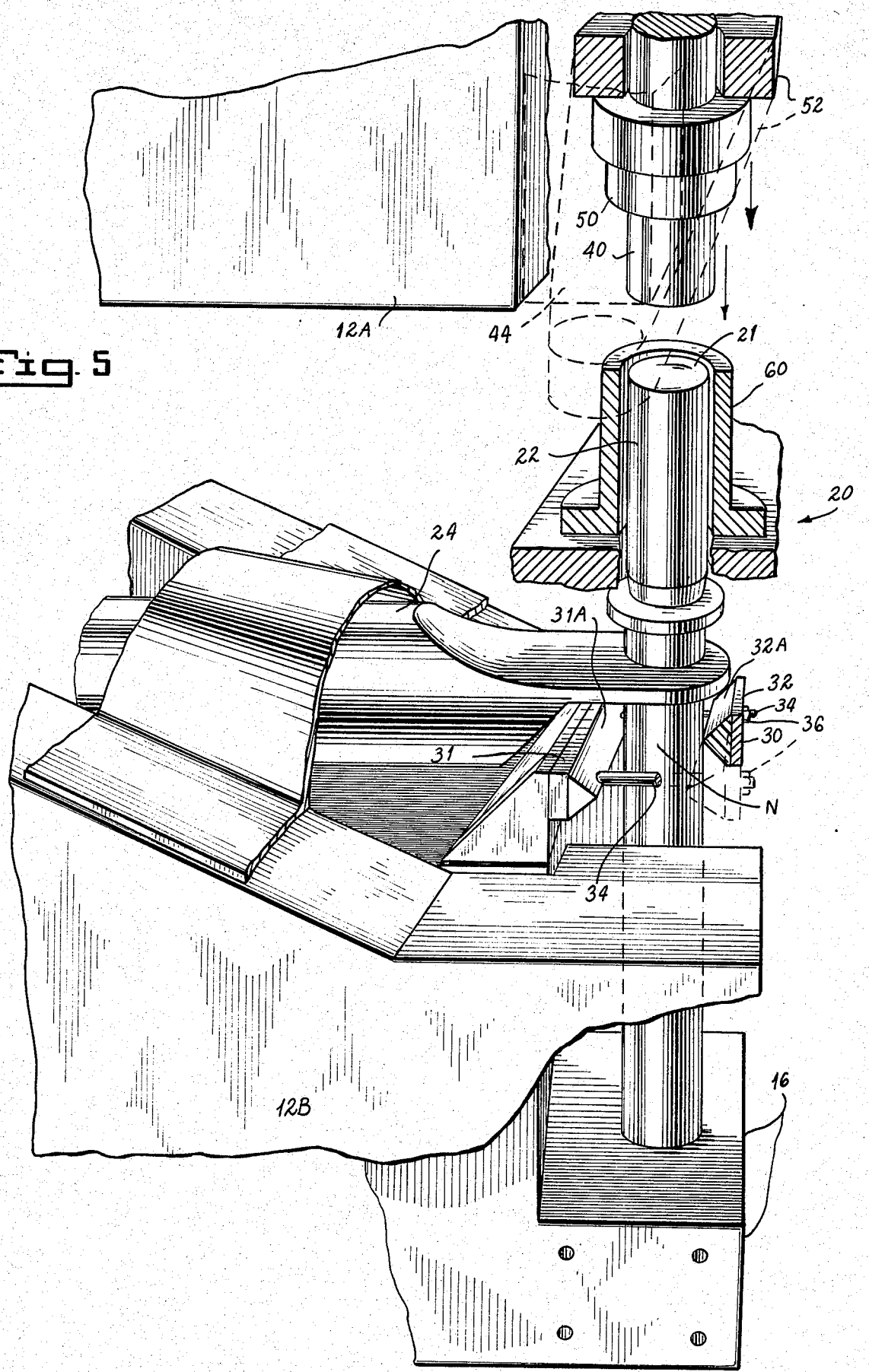
FIG. 5 is an enlarged perspective, break-away view illustrating the clamping and read stabilizing means of the present invention.

The welder 10 is able to effect the previously discussed objects by two interrelated stabilization/clamping systems. Stabilization of the perpendicular vibratory reed 22 is accomplished, as shown in FIGS. 2 and 5, by providing a reed stabilizer 30 which clamps about the perpendicular vibratory reed 22 at its nodal point N. Reed stabilizer 30 includes opposed inside and outside arm portions 31 and 32, respectively, each of which have V-shaped wedge portions 31A and 32A, respectively, adapted to contact the reed 22. Wedge portions 31A and 32A are preferably formed from a somewhat resilient material such as, for example, Teflon, which permits compensation for minor errors in locating the exact nodal point N on the reed 22. Teflon will yield somewhat to the strong transverse vibrations of reed 22 but will resist any persistent inclination of the reed 22 from being deflected from its normal location.

As shown in FIG. 5, inside arm portion 31 is secured to the stationary frame 16 of the welding machine 10. Outside arm portion 32 is secured to inside arm portion 31 by a pair of connecting bolts 34 which extend outwardly from inside arm portion 31 on either side of reed 22, pass through apertures contained in outside arm portion 32 and are secured thereto by nuts 36. Stabilization of the reed 22 is effected by tightening the nuts 36 until sufficient tension is exerted against the reed 22 by the opposed inside and outside arm portions 31 and 32, respectively, with the reed 22 being stabilized between the respective opposed wedges 31A and 32A. It will be appreciated that by supported vibratory reed 22 at its nodal point N by arm portions 31 and 32, the reed is stabilized during subsequent welding operations. Clamping of the workpiece W is effected by movable collar clamp 50 about the anvil 40 and stationary collar clamp 60 about the welding tip 21. Movable collar clamp 50, as shown in FIG. 2, is mounted on clamp housing 52 which can be raised and lowered along rails 54 by hydraulic clamp cylinders 56. Stationary collar clamp 60, which surrounds the welding tip 21, is mounted on clamping frame 12.

As discussed earlier and as shown in FIGS. 1–3, clamping frame 12 is independently and pivotably mounted on stationary frame 16 at pivot 14. Thus, in order to effect clamping of the workpieces W, prior to welding as shown in FIG. 4, the workpieces are inserted into the throat T between the anvil 40 and the welding tip 21 and the movable clamp 50 is lowered in the clamping direction C by actuating hydraulic clamping cylinders 56 which causes clamp housing 52 to descend until the workpieces W are tightly held between clamps 50 and 60. Ultrasonic energy is then transmitted from the welding tip 21 into and through the workpieces W and a weld is effected therebetween. The independence of the pivotal mounting of the clamping frame 12 relative to the welder frame 16 is illustrated in FIG. 3. It will be appreciated that by providing an independent clamping frame 12 to which the respective clamps 50 and 60 are secured and pivotably mounting the clamp frame 12 to the welder frame 16, the clamping system is wholly independent of the welding portions of the machine 10.

The above-described clamping system provides a number of distinct advantages. It does not restrict the throat T of the welding machine 10 and is sufficiently strong to withstand the clamping loads without any serious deflections. Additionally, the clamping frame 12 has sufficient mass to resist acceleration or movement under impacts of up to about 4000 watts generated by the welding tip 21. Further, it is sufficient to provide primarily vertical motion with a minimum of horizontal motion. Free vertical motion is critical for maintaining the plane that exists halfway between the clamp faces exactly in the same plane as that plane that exists halfway between the welding tip 21 and the anvil 40. Without this condition, it is very difficult to effect good welds while clamping. Moreover, pivot radius is sufficiently large to avoid a significant angular pitching of the clamp from the horizontal.

Having thus described the invention with particular reference to the preferred forms thereof, it will be obvious that various changes and modifications may be made therein without departing from the spirit and scope of the present invention.

Wherefore, I claim:

1. Ultrasonic vibratory spot welding apparatus of the type having a welding tip and a complimentary anvil both mounted on a stationary welding frame and defining a throat into which workpieces may be inserted for welding, said welding tip comprising one end of a vibratory reed and adapted to introduce into and through said workpieces high frequency vibratory energy in order to effect a weld between said workpieces, wherein said apparatus includes clamping means associated with both the welding tip and the anvil for clamping together said workpieces prior to and during welding, said clamping means being mounted on a clamping frame which is substantially independent in movement of said stationary welding frame.

2. The apparatus of claim 1 wherein said clamping means comprises at least one collar clamp provided about both the anvil and the reed at the welding tip, one of said collar clamps being movable in a direction toward and away from the other clamp, said other clamp being stationary on the clamping frame.

3. The apparatus of claim 2 wherein the clamp about said anvil is movable and wherein the clamp about said welding tip is stationary on the clamping frame.

4. The apparatus of claim 1 wherein the clamping frame is pivotably mounted to said welding frame so as to provide free vertical motion to the horizontal welding plane.

5. The apparatus of claim 3 wherein the collar clamp provided about said anvil is mounted on a clamp housing and wherein said claim housing is adapted to move toward and away from said welding tip.

6. The apparatus of claim 5 wherein said clamp housing is powered by at least one hydraulic cylinder.

7. Ultrasonic vibratory spot welding apparatus of the type having a welding tip and a complimentary anvil both mounted on a stationary welding frame so as to define a throat into which workpieces may be inserted for welding, said welding tip comprising one end of a vibratory reed which is connected to a transducer and adapted to introduce into and through said workpieces high frequency vibratory energy in order to effect a weld between said workpieces, wherein said apparatus includes a reed stabilizer for clamping about and securing said reed to said stationary welding frame at the nodal point of said reed, said reed stabilizer including opposed inside and outside arm portions provided an opposite sides of said reed and means for interconnecting said arm portions.

8. The apparatus of claim 7 wherein resilient V-shaped wedge portions are provided on said opposed arm portions for contacting said reed.

* * * * *